(12) United States Patent
Li et al.

(10) Patent No.: US 10,885,933 B2
(45) Date of Patent: Jan. 5, 2021

(54) GIANT SPIN-SEEBECK EFFECT INDUCED MAGNON TRANSFER TORQUE-ASSISTED MAMR

(71) Applicant: Western Digital Technologies, Inc., San Jose, CA (US)

(72) Inventors: Zhanjie Li, Pleasanton, CA (US); Suping Song, Fremont, CA (US); Michael Kuok San Ho, Emerald Hills, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/451,744

(22) Filed: Jun. 25, 2019

(65) Prior Publication Data

US 2020/0176022 A1 Jun. 4, 2020

Related U.S. Application Data

(60) Provisional application No. 62/775,376, filed on Dec. 4, 2018.

(51) Int. Cl.
*G11B 5/21* (2006.01)
*G11B 5/11* (2006.01)

(52) U.S. Cl.
CPC . *G11B 5/21* (2013.01); *G11B 5/11* (2013.01)

(58) Field of Classification Search
CPC .................................. G11B 5/21; G11B 5/11
(Continued)

(56) References Cited

U.S. PATENT DOCUMENTS 8,422,159 B2  4/2013  Gao et al.
8,582,240 B1  11/2013 Chen et al.
(Continued)

FOREIGN PATENT DOCUMENTS

CN    105788613 A    7/2016
CN    106448706 A    2/2017
(Continued)

OTHER PUBLICATIONS

Pushp, Aakash et al.; "Giant Thermal Spin-Torque-Assisted Magnetic Tunnel Junction Switching" CrossMark; PNAS, vol. 112, No. 21; www.pnas.org/cgi/doi/10.1073/pnas.1507084112; May 26, 2015 (pp. 6585-6590).
(Continued)

*Primary Examiner* — Allen T Cao
(74) *Attorney, Agent, or Firm* — Patterson & Sheridan, LLP; Steven H. Versteeg (57) ABSTRACT

A magnetic recording device includes a main pole, a coil around the main pole, a trailing shield, and a spin torque oscillation device between the main pole and the trailing shield. The spin torque oscillation device includes one or more first layers, a spacer layer, and a field generation layer. The one or more first layers are over the main pole. The one or more first layers have a first heat conductance or include a low-heat-conductance material. The spacer layer is over the one or more first layers. The field generation layer is over the spacer layer. A heat sink is in contact with the trailing shield. The heat sink has a second heat conductance or includes a high-heat-conductance material. The second heat conductance of the heat sink is higher than the first heat conductance of the one or more first layers.

17 Claims, 7 Drawing Sheets

(58) Field of Classification Search
USPC .................................................... 360/125.32
See application file for complete search history.

(56) References Cited

U.S. PATENT DOCUMENTS

| | | | |
|---|---|---|---|
| 8,995,088 B1 * | 3/2015 | Boone .................. | G11B 5/3146 360/125.32 |
| 9,025,281 B2 | 5/2015 | Rejda et al. | |
| 9,099,107 B1 | 8/2015 | Igarashi et al. | |
| 9,117,474 B1 | 8/2015 | Contreras et al. | |
| 9,230,571 B1 | 1/2016 | Chen et al. | |
| 9,275,672 B2 | 3/2016 | Shiroishi et al. | |
| 9,368,135 B2 | 6/2016 | Gao | |
| 9,691,416 B1 | 6/2017 | Izawa et al. | |
| 9,792,930 B1 | 10/2017 | Shimizu et al. | |
| 9,881,637 B1 | 1/2018 | Wilson et al. | |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Choi, Gyung-Min; "Thermal Spin-Transfer Torque Driven by the Spin-Dependent Seebeck Effect in Metallic Spin-Valves" Nature Physics; http://www.nature.com/articles/nphys3355; vol. 11, 2015, (pp. 576-581).

Tang, Hui-Min et al.; "Thermal Spin Transfer Torque in Fe|Ag|YIG Multilayers" Springer, Frontiers of Physics; http://link.springer.com/article/10.1007/s11467-016-0649-3, Jun. 9, 2017 (9 pages).

Mallory, Mike et al; "Head and Media Challenges for 3 Tb/int Microwave-Assisted Magnetic Recording"; IEEE Transactions on Magnetics, vol. 50, No. 7, Jul. 2014 (8 pages).

* cited by examiner

Fig. 6

GIANT SPIN-SEEBECK EFFECT INDUCED MAGNON TRANSFER TORQUE-ASSISTED MAMR

CROSS-REFERENCE TO RELATED APPLICATIONS

This application claims the benefit of U.S. Provisional Patent Application Ser. No. 62/775,376, filed Dec. 4, 2018, which is herein incorporated by reference.

BACKGROUND OF THE DISCLOSURE

Field of the Disclosure

Embodiments of the present disclosure generally relate to data storage devices, and more specifically, to a magnetic media drive employing a temperature gradient in a microwave-assisted magnetic recording (MAMR) device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording head at an air bearing surface of the recording medium. As the main pole becomes smaller, the recording field becomes smaller as well, limiting the effectiveness of the magnetic recording head.

Heat-assisted magnetic recording (HAMR) and microwave assisted magnetic recording (MAMR) are two types of energy-assisted recording technology to improve the recording density of a magnetic recording medium, such as a HDD. In MAMR, an oscillation element or device is located next to or near the write element in order to produce a high-frequency magnetic field, such as in a microwave frequency band. The high-frequency magnetic field (in addition to a recording magnetic field emanated from a main pole of the write element) reduces an effective coercivity of a magnetic recording medium used to store data and allows writing of the magnetic recording medium at lower magnetic fields emanated from the write pole. Thus, higher recording density of the magnetic recording medium may be achieved by MAMR technology. Therefore, there is a need in the art for a magnetic recording head to achieve higher recording density of the magnetic recording medium.

SUMMARY OF THE DISCLOSURE

Embodiments of the present disclosure generally relate to a magnetic media drive employing a temperature gradient in a microwave-assisted magnetic recording (MAMR) device.

In one embodiment, a magnetic recording device includes a main pole, a coil around the main pole, a trailing shield having a notch, and a spin torque oscillation device between the main pole and the notch of the trailing shield. The spin torque oscillation device includes a non-magnetic conductive layer and a field generation layer. The non-magnetic conductive layer is over the main pole. The non-magnetic conductive layer has a first heat conductance or includes a low-heat-conductance material. The field generation layer is between the non-magnetic conductive layer and the notch of the trailing shield. A heat sink is wrapped around the notch of the trailing shield. The heat sink has a second heat conductance or includes a high-heat-conductance material. The second heat conductance of the heat sink is higher than the first heat conductance of the non-magnetic conductive layer.

In another embodiment, a magnetic recording device includes a main pole, a coil around the main pole, a trailing shield, and a spin torque oscillation device between the main pole and the trailing shield. The spin torque oscillation device includes one or more first layers, a spacer layer, and a field generation layer. The one or more first layers are over the main pole. The one or more first layers have a first heat conductance or include a low-heat-conductance material. The one or more first layers may be a non-magnetic conductive layer and/or a spin polarization layer. The spacer layer is over the one or more first layers. The field generation layer is over the spacer layer. A heat sink is in contact with the trailing shield. The heat sink has a second heat conductance or includes a high-heat-conductance material. The second heat conductance of the heat sink is higher than the first heat conductance of the one or more first layers.

In one embodiment, a method of writing data to a magnetic medium includes providing a write current to a coil around a main pole to produce a recording field. An electron current is provided from the main pole through a field generation layer of a spin torque oscillation device to a trailing shield to produce a microwave assisting field. A temperature gradient from hot to cold is produced across the field generation layer in a direction from the main pole to the trailing shield. A magnon spin current is produced from the temperature gradient. The magnon spin current assists in reversal of a magnetization direction the field generation layer.

In still another embodiment, a magnetic recording device includes a writing means for providing a writing magnetic field. A spin torque oscillation means generates a microwave assisting field. A temperature gradient means produces a magnon spin current to assist in reversal of a magnetization direction of the spin torque oscillation means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The terms "over," "under," "between," "on", and other similar terms as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. The relative position of the terms does not define or limit the layers to a vector space orientation of the layers.

The term "comprises/comprising" includes the subset meaning of "consists/consisting essentially of" and includes the subset meaning of "consists/consisting of."

In certain embodiments, the present MAMR head includes a spin torque oscillation (STO) device between a main pole and a trailing shield. The STO device includes one or more first layers proximate the main pole. The one or more first layers have a first heat conductance or include a low-heat-conductance material. A heat sink is wrapped around a notch of the trailing shield. The heat sink has a second heat conductance or includes a high-heat-conductance material. The second heat conductance of the heat sink is higher than the first heat conductance of the one or more first layers. The high-heat-conductance of the heat sink and the low-heat-conductance of the one or more first layers produce a temperature gradient across the STO device from relatively hot to relatively cold in a direction from the main pole to the trailing shield. A magnon spin current is produced from the temperature gradient. The magnon spin current assists in the reversal of a magnetization direction of a field generation layer and/or spin polarization layer of the STO device.

Figure 1:
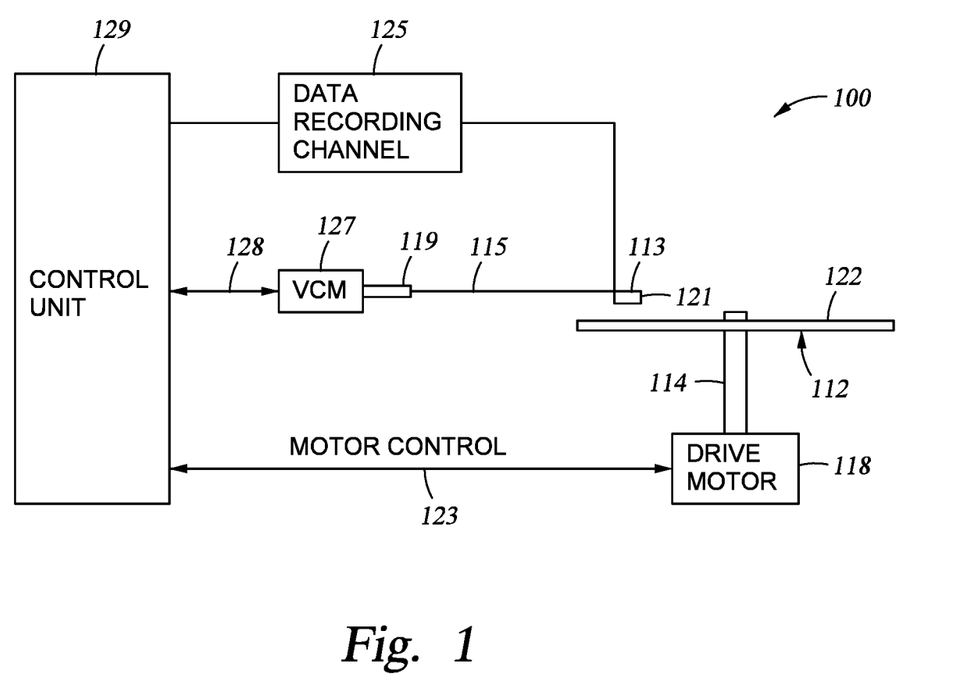
FIG. 1 is a schematic illustration of certain embodiments of a magnetic media drive including a magnetic recording head.

FIG. 1 is a schematic illustration of certain embodiments of a magnetic media drive including a magnetic recording head, such as a MAMR head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a MAMR head including a STO device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
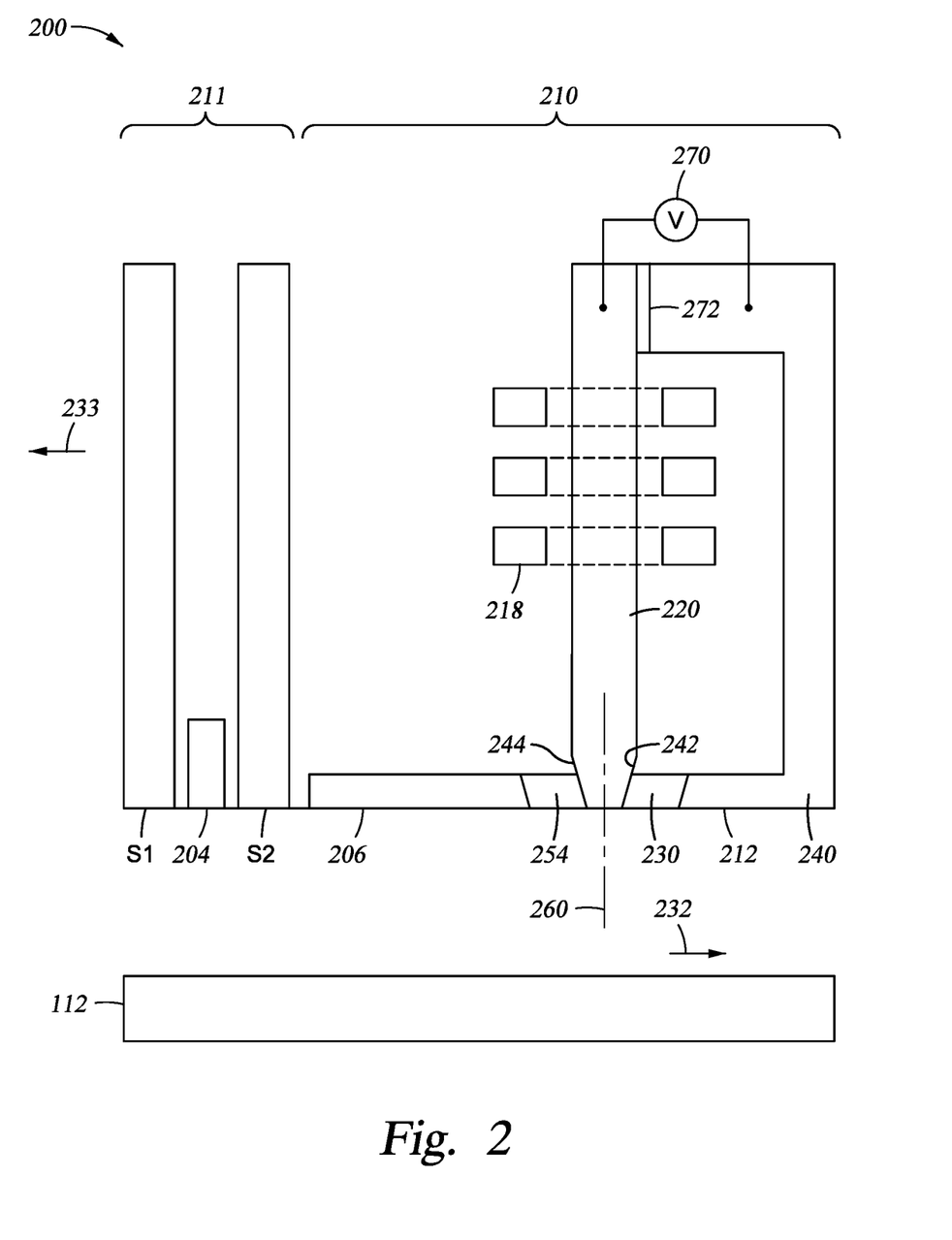
FIG. 2 is a schematic illustration of certain embodiments of a cross sectional side view of a head assembly facing a magnetic disk.

FIG. 2 is a schematic illustration of certain embodiments of a cross sectional side view of a head assembly 200 facing the magnetic disk 112. The head assembly 200 may correspond to the head assembly 121 described in FIG. 1. The head assembly 200 includes a media facing surface (MFS) 212, such as an air bearing surface (ABS), facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a write head 210, such as a MAMR head. In certain embodiments, the write head 210 includes a main pole 220, a leading shield 206, a trailing shield 240, and a spin torque oscillator device 230 disposed between the main pole 220 and the trailing shield 240. The main pole 220 serves as a first electrode and has a front portion at the ABS.

The main pole 220 comprises a magnetic material, such as CoFe, CoFeNi, or FeNi, other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition, such as electroplating. The write head 210 includes a coil 218 around the main pole 220 that excites the main pole 220 producing a writing magnetic field structures for affecting a magnetic medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The trailing shield 240 is a magnetic material, such as CoFe, CoFeNi, FeNi, or other suitable magnetic materials, serving as a second electrode and return pole for the main pole 220. The leading shield 206 may provide electromagnetic shielding and is separated from the main pole 220 by a leading gap 254.

The STO device 230 is positioned proximate the main pole 220 and reduces the coercive force of the magnetic medium, so that smaller recording fields can be used to record data. An electron current is applied to STO device 230 from a power source 270 to produce a microwave field. The electron current may be a direct current (DC) waveforms, pulsed DC waveforms, and/or pulsed current waveforms going to positive and negative voltages. The STO device 230 may be electrically coupled to the main pole 220 and the trailing shield 240 in which the main pole 220 and the trailing shield are separated by an insulating layer 272. The power source 270 may provide electron current to the STO device 230 through the main pole 220 and the trailing shield 240. For direct current or pulsed current, the power source 270 may flow electron current from the main pole 220 through the STO device 230 to the trailing shield 240 or may flow electron current from the trailing shield 240 through the STO device 230 to the main pole 220 depending on the orientation of the STO device 230. In other embodiments, the STO device 230 may be coupled to electrical leads providing an electron current other than from the main pole and/or the trailing shield.

Figure 3:
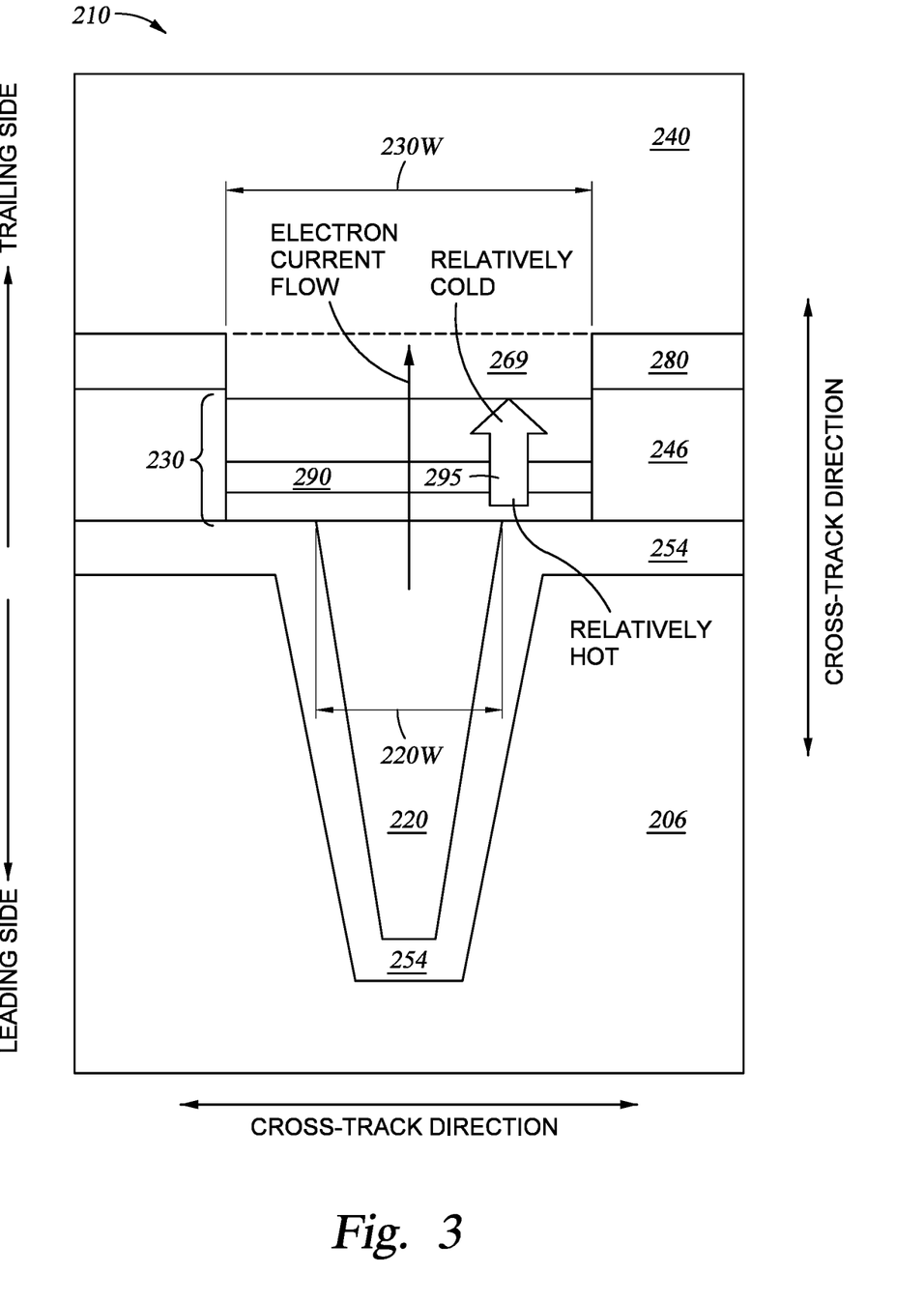
FIG. 3 is a schematic illustration of certain embodiments of a plan view of a media facing surface of a MAMR head of FIG. 2 with a STO device between a main pole and a trailing shield in a track direction.

FIG. 3 is a schematic illustration of certain embodiments of a plan view of a media facing surface of a MAMR head 210 of FIG. 2 with a STO device 230 between a main pole 220 and a trailing shield 240 in the track direction. The main pole 220 of the MAMR magnetic recording head 210 may be any suitable shape (i.e., trapezoidal, triangular, etc.) and suitable dimensions. The STO device 230 may be formed to any suitable shape, any suitable dimension, and any suitable position between the main pole 220 and the trailing shield 240. For example, the width 230W of the STO device 230 may be greater than, equal to, or less than the width 220W of the main pole 220 at the interface with the STO device 230. The STO device 230 is positioned proximate the main pole 220 and reduces the coercive force of the magnetic medium, so that smaller recording fields can be used to record data. A bias current applied to the STO device 230 from the power source 270 of FIG. 2 produces an assisting magnetic field, such as a microwave field. The bias current may be direct current (DC) waveforms, pulsed DC waveforms, and/or pulsed current waveforms going to positive and negative voltages. In certain embodiments, the STO device 230 is formed over a notch 269. The notch 269 may be an attached notch formed by patterning and lithography processes of the trailing shield 240 to form the notch 269 to any suitable dimension. In other embodiments, notch 269 may be a detached notch in which the notch is formed from a deposited layer over the trailing shield 240. For ease of description, an attached notch and a detached notch are collectively referred to as notch 269. The notch 269 helps to alleviate cross-track interference and to minimize formation of stray fields.

The STO device 230 comprises one or more low-heat-conductance layers 290 proximate the main pole 220 and/or in contact with the main pole 220. The low-heat-conductance layer 290 comprises a material having a low thermal conductivity measured at 25° C. at atmospheric pressure of about 90 W/m·K or lower, such as 60 W/m·K or lower or such as 30 W/m·K or lower.

In certain embodiments, a heat sink 280 is formed wrapping around the notch 269. In certain embodiments, the heat sink 280 comprises a high-heat-conductance electrically-conductive material, such as silver, copper, gold, aluminum, tungsten, alloys thereof, graphite, carbon nanotubes, and multiple layers thereof. In certain embodiments, the heat sink 280 comprises a high-heat-conductance electrically-conductive material having a high thermal conductivity measured at 25° C. at atmospheric pressure of about 130 W/m·K or higher, such as about 150 W/m·K or higher or such as about 170 W/m·K or higher. In certain embodiments, the heat sink 280 comprises a high-heat-conductance electrically-insulating material, such as aluminum nitride (AlN), silicon carbide (SiC), diamond-like carbon, other high-heat-conductance dielectric ceramics, and multiple layers thereof. In certain embodiments, the heat sink 280 comprises a high-heat-conductance electrically-insulating material having a thermal conductivity measured at 25° C. at atmospheric pressure of about 130 W/m·K or higher, such as about 150 W/m·K or higher or such as about 170 W/m·K or higher.

The low-heat-conductance layer 290 of the STO device 230 and the heat sink 280 form a temperature gradient 295 across the STO device 230. The temperature gradient 295 of the STO device 230 comprises a relatively hot region proximate the main pole 220 and a relatively cold region proximate the trailing shied 240.

A leading shield 206 may be positioned on one or more sides of the main pole 220 with the leading gap 254 therebetween. A side gap 246 may be positioned on the sides of the STO device 230. The leading gap 254 and the side gap 246 may comprise an insulating material.

Figure 4:
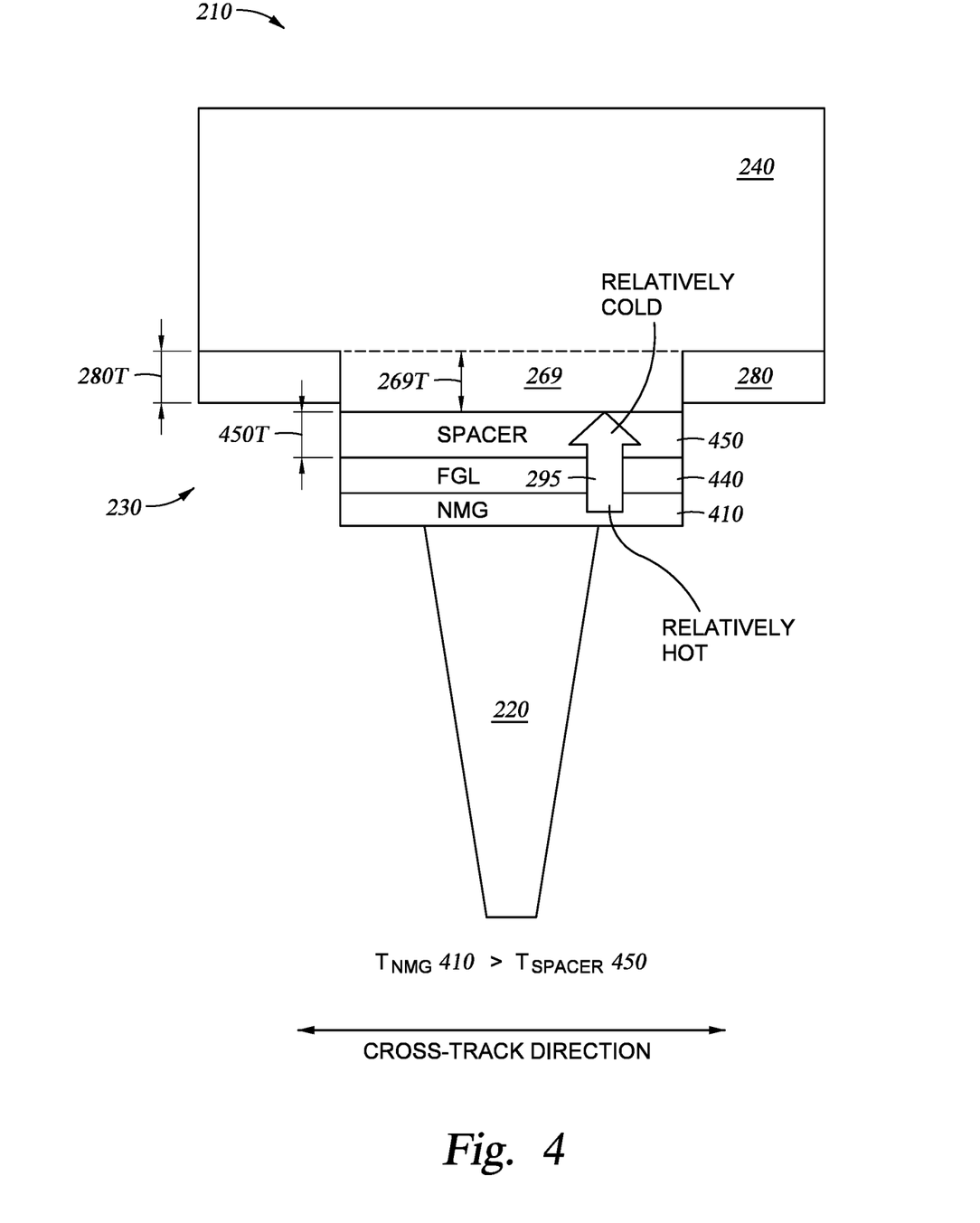
FIG. 4 is a schematic illustration of certain embodiments of a plan view of a media facing of a STO device comprising a field generation layer formed over a notch of a trailing shield.
Figure 5:
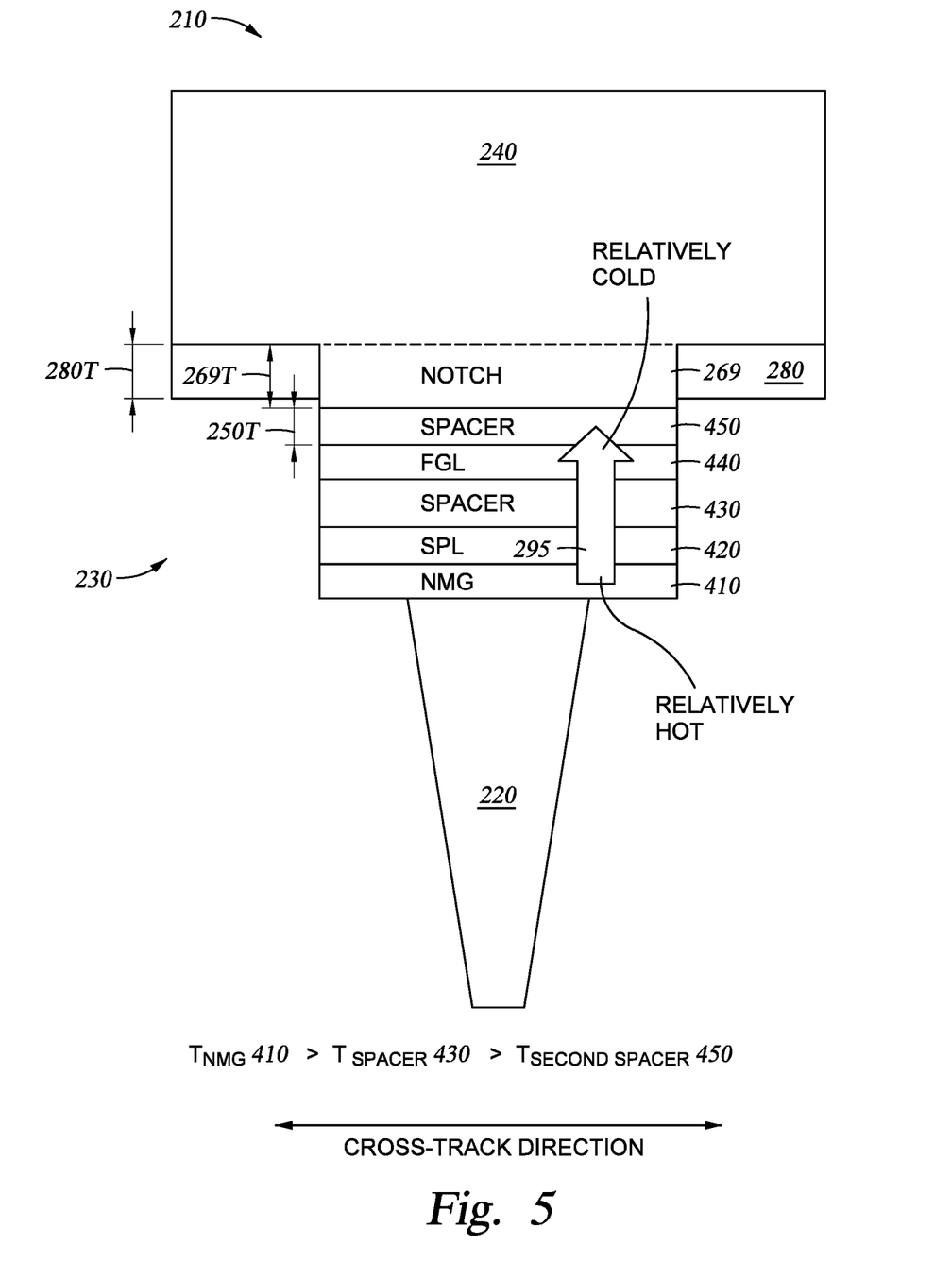
FIG. 5 is a schematic illustration of certain embodiments of a plan view of a media facing of a STO device comprising a spin polarization layer and a field generation layer formed over a notch of a trailing shield.
Figure 6:
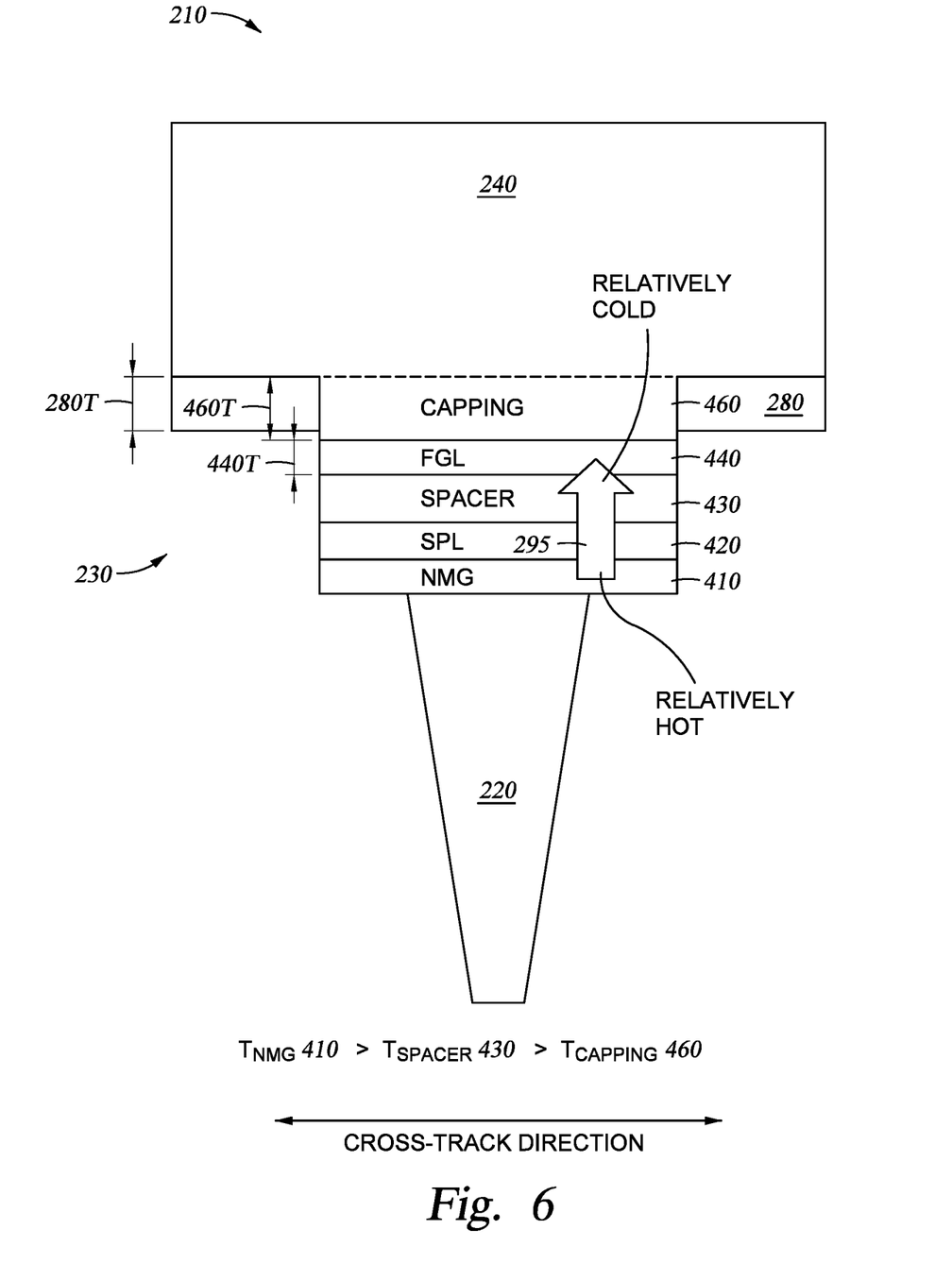
FIG. 6 is a schematic illustration of certain embodiments of a plan view of a media facing of a STO device comprising a spin polarization layer and a field generation layer formed over a trailing shield without a notch.

FIGS. 4-6 are schematic illustrations of certain embodiments of a plan view of a media facing of a STO device 230 of the MAMR head 210 of FIG. 2 and FIG. 3 and like numerals have been used for ease of description. The STO device 230 may be formed by deposition or lamination of materials over the main pole 220 along with patterning and lithography processes or by deposition or lamination of materials over the notch 269 of the trailing shield 240 along with patterning and lithography processes.

Each of the STO devices 230 of FIGS. 4-6 includes a field generation layer (FGL) 440. The FGL 440 may comprise FeCo, NiFe, CoPt, CoCr, CoIr, CoFeAli, CoFeGe, CoMnGe, CoFeAl, CoFeSi, CoMnSi, TbFeCo, and other magnetic materials.

In FIG. 4, the STO device 230 is formed between the main pole 220 and the notch 269 of the trailing shield 240. The STO device 230 includes a non-magnetic conductive (NMG) layer 410 over or on the main pole 220, the FGL 440 over or on the NMG layer 410, and a spacer layer 450 over or on the FGL 440. The heat sink 280 is wrapped around notch 269 of the trailing shield 240.

In certain embodiments, the NMG layer 410 includes NiCr, Cr, Pt, Ir, Cu, Ta, Ru, other non-magnetic conductive materials, alloys thereof, and multiple layers thereof. The NMG layer 410 comprises a conductive material so that a bias electron current may flow from the main pole 220 through the STO device 230 to the notch 269 of the trailing shield 240.

The spacer layer 450 between the FGL 268 and the notch 269 includes one or more non-magnetic conductive materials, such as Au, Ag, Pt, Ta, Ir, Al, Si, Ge, Ti, Cu, Pd, Ru, Mo, W, AgSn, other non-magnetic conductive materials, alloys thereof, and multiple layers thereof.

The recording magnetic field applied from the main pole 220 to the STO device 230 maintains the magnetization direction of the FGL 440 so that the FGL 440 can oscillate to produce a microwave field. The notch 269 of the trailing shield 240 acts as a reference layer. When an electron current (such as a current density on the order of $1 \times 10^8$ A/cm$^2$) flows through the STO device 230, such as from the main pole 220 to the trailing shield 240, the electrons passing through the FGL 440 imparts a spin torque to the FGL 440 causing the FGL 440 to emit a high-frequency rotating or oscillating magnetic field, such as a microwave field. The microwave field emitted to the magnetic recording medium assists the recording magnetic field by reducing the coercive force and reducing the switching field threshold of the recording medium.

In certain embodiments, the NMG layer 410 comprises a low-heat-conductance material. Examples of low-heat conductance materials of the non-magnetic-conductive (NMG) layer 410 include ruthenium, tantalum, non-magnetic nickel alloys, non-magnetic iron alloys, alloys thereof, and multiple layers thereof.

The low-heat-conductance NMG layer 410 and the heat sink 280 form the temperature gradient 295. The temperature gradient 295 is formed across the FGL 440 in which the temperature of the NMG layer 410 is relatively hotter than the temperature of the spacer layer 450. Due to the giant spin-Seebeck effect, the temperature gradient 295 causes a thermal spin current or magnon spin current through the FGL 440. The magnitude of the magnon spin current is proportional to the magnitude of the temperature gradient 295. The direction of the magnon spin current is in the direction of the temperature gradient 295 from hot to cold in a direction from the main pole 220 to the trailing shield 240.

In certain embodiments, the heat sink 280 comprising a high-heat-conductance electrically-conductive material is formed to a thickness 280T that is equal to or less than the thickness 269T of the notch 269. In certain embodiments, the heat sink 280 is formed to a thickness 280T less than the thickness 269T of the notch 269 to help ensure that electron current flow is from the main pole 220 through the NMG layer 410, through the FGL 440, through the spacer layer 450, and to the notch 269. If the heat sink 280 comprising a high-heat-conductance electrically-conductive material is formed to a thickness 280T that is greater than the thickness 269T of the notch 269, then some electron current may undesirably bypass the notch 269 and flow directly through the heat sink 280. Electron current by-passing the notch 269 would undesirably reduce the transmittal of spin current to the FGL 440 and would undesirably reduce the generated high-frequency assisting magnetic field, such as a microwave field.

In certain embodiments, the heat sink 280 comprising a high-heat-conductance electrically-insulating material is formed to any suitable thickness 280T in comparison to the thickness of the notch 269, such as less than, equal to, or greater than the thickness 269T of the notch 269. For example, the heat sink 280 may be formed to a thickness 280T greater than the thickness of the notch 269 for increased dissipation of the heat of the notch 269. For embodiments in which the heat sink 280 comprises a high-heat-conductance electrically-insulating material, electron current flow is from the main pole 220 through the NMG layer 410, through the FGL 440, through the spacer layer 450, and to the notch 269 without bypassing the notch 269 since the heat sink 280 is electrically insulative. In certain embodiments, the thickness 280T of the heat sink 280 comprising a high-heat-conductance electrically-insulating material is larger than the thickness 269T of the notch 269 but less than the thickness 450T of the spacer layer 450 plus the thickness 269T of the notch 269.

In FIG. 5, the STO device 230 is formed between the main pole 220 and the notch 269 of the trailing shield 240. The STO device 230 comprises a non-magnetic conductive (NMG) layer 410 over or on the main pole 220, a spin polarization layer (SPL) 420 over or on the NMG layer 410, a first spacer layer 430 over or on the SPL 420, the FGL 440 over or on the spacer layer 430, and a second spacer layer 450 over or on the FGL 440. The heat sink 280 is wrapped around notch 269 of the trailing shield 240.

In certain embodiments, the NMG layer 410 comprises NiCr, Cr, Pt, Ir, Cu, Ta, Ru, other non-magnetic conductive materials, alloys thereof, and multiple layers thereof. The NMG layer 410 comprises a conductive material so that a bias electron current may flow from the main pole 220 through the STO device 230 to the notch 269 of the trailing shield 240.

In certain embodiments, the SPL 420 comprises NiFe, CoFe, CoFeNi, CoMnGe, NiCo, NiFeCu, CoFeMnGe, CoMnSi, CoFeSi, other high magnetic anisotropy materials, other Heusler alloys, other suitable magnetic layers, and multiple layers thereof. The SPL 420 can comprise a material having magnetic anisotropy oriented in a direction perpendicular or longitudinal to the film plane of the SPL 420. The SPL 420 transmits spin torque to the FGL 440 causing oscillation of the magnetization of the FGL 440 at high velocity in a plane to thereby generate a high-frequency magnetic field, such as a microwave field. The magnetization direction of the SPL 420 is switchable by the recording field of the write pole 220. Reversal of the magnetization direction of the SPL 420 switches the magnetization direction of the injected electrons into the FGL 440.

Spin torque transmitted from the SPL 420 to the FGL 440 causes oscillation of the magnetization of the FGL 440 generating a high-frequency magnetic field, such as a microwave field. The recording magnetic field applied from the main pole 220 to the STO device 230 maintains the magnetization direction of the SPL 420 and the FGL 440 so that the FGL 440 can oscillate to produce a microwave field. When an electron current flows through the STO device 230 from the SPL 420, such as from the main pole 220 to the trailing shield 240, the electrons passing through the SPL 420 are polarized. The stream of polarized electrons from the SPL 420 to the FGL 440 imparts a spin torque to the FGL 440 causing the FGL 440 to emit a high-frequency magnetic field to the magnetic recording medium reducing the coercive force and reducing the switching field threshold of the recording medium. The spin torque transmitted from SPL 420 to the FGL 440 along with the spin current produced by the notch 269 acting as a reference layer produce a microwave assisting field.

The first spacer layer 430 between the SPL 420 and the FGL 440 may include one or more non-magnetic conductive materials, such as Au, Ag, Pt, Ta, Ir, Al, Si, Ge, Ti, Cu, Pd, Ru, Mo, W, AgSn, other non-magnetic conductive materials, alloys thereof, and multiple layers thereof. The first spacer layer 430 may reduce exchange coupling between the SPL 420 and the FGL 440. The first spacer layer 430 may be made of a material having a high spin transmissivity for spin torque transfer from the SPL 420 to the FGL 440.

The second spacer layer 450 between the FGL 268 and the notch 269 may include one or more non-magnetic conductive materials, such as Au, Ag, Pt, Ta, Ir, Al, Si, Ge, Ti, Cu, Pd, Ru, Mo, W, AgSn, other non-magnetic conductive materials, alloys thereof, and multiple layers thereof.

In certain embodiments, the NMG layer 410 comprises a low-heat-conductance layer. Examples of low-heat conductance materials of the non-magnetic-conductive (NMG) layer 410 include ruthenium, tantalum, non-magnetic nickel alloys, non-magnetic iron alloys, alloys thereof, and multiple layers thereof. In certain embodiments, the SPL 420 comprises a low-heat-conductance material. Examples of low-heat conductance materials of the SPL 420 include magnetic nickel alloys, magnetic iron alloys, alloys thereof, and multiple layers thereof. In certain embodiments, both the NMG layer 410 and the SPL 420 comprise a low-heat-conductance layer.

The low-heat-conductance layer (NMG layer 410 and/or SPL 420) and the heat sink 280 form the temperature gradient 295. The temperature gradient 295 is formed across the SPL 420 and FGL 440 in which the temperature of the NMG layer 410 is relatively hotter than the temperature of the first spacer layer 430 and in which the first spacer layer 430 is relatively hotter than the second spacer layer 450. Due to the giant spin-Seebeck effect, the temperature gradient 295 causes a thermal spin current or magnon spin current through the FGL 440. The magnitude of the magnon spin current is proportional to the magnitude of the temperature gradient 295. The direction of the magnon spin current is in the direction of the temperature gradient 295 from hot to cold in a direction from the main pole 220 to the trailing shield 240.

In certain embodiments, the heat sink 280 comprising a high-heat-conductance electrically-conductive material is formed to a thickness 280T that is equal to or less than the thickness 269T of the notch 269. In certain embodiments, the heat sink 280 is formed to a thickness 280T less than the thickness 269T of the notch 269 to help ensure that electron current flow is from the main pole 220 through the NMG layer 410, through the SPL 420, through the first spacer layer 430, through the FGL 440, through the second spacer layer 450, and to the notch 269. If the heat sink 280 comprising a high-heat-conductance electrically-conductive material is formed to a thickness 280T that is greater than the thickness 269T of the notch 269, then some electron current may undesirably bypass the notch 269 and flow directly through the heat sink 280. Electron current by-passing the notch 269 would undesirably reduce the transmittal of spin current to the FGL 440 and would undesirably reduce the generated high-frequency assisting magnetic field, such as a microwave field.

In certain embodiments, the heat sink 280 comprising a high-heat-conductance electrically-insulating material is formed to any suitable thickness 280T is comparison to the thickness of the notch 269, such as less than, equal to, or greater than the thickness 269T of the notch 269. For example, the heat sink 280 may be formed to a thickness 280T greater than the thickness of the notch 269 for increased dissipation of the heat of the notch 269. For embodiments in which the heat sink 280 comprises a high-heat-conductance electrically-insulating material, electron current flow is from the main pole 220 through the NMG layer 410, through the SPL 420, through the first spacer layer 430, through the FGL 440, through the second spacer layer 450, and to the notch 269 without bypassing the notch 269 since the heat sink 280 is electrically insulative. In certain embodiments, the thickness 280T of the heat sink 280 comprising a high-heat-conductance electrically-insulating material is larger than the thickness 269T of the notch 269 but less than the thickness 450T of the second spacer layer 450 plus the thickness 269T of the notch 269 to help ensure the temperature gradient 295 is relatively hot to cold in a direction from main pole 220 to trailing shield 240.

In FIG. 6, the STO device 230 is formed over the trailing shield 240 without a notch. The STO device 230 comprises a non-magnetic conductive (NMG) layer 410 over or on the main pole 220, a spin polarization layer (SPL) 420 over or on the NMG layer 410, a spacer layer 430 over or on the SPL 420, the FGL 440 over or on the spacer layer 430, and a capping layer 460 over or on the FGL 440. The STO device 230 of FIG. 5 and FIG. 6 are similar except the STO device 230 is formed over the trailing shield 240 without a notch.

As shown in FIG. 6, a capping layer 460 is formed between the FGL 440 and the trailing shield 240. The capping layer 460 may comprise one or more non-magnetic conductive layers, or combinations thereof. Examples of a non-magnetic conductive layer of the capping layer 460 comprises NiCr, Cr, Pt, Ir, Ta, Ru, other non-magnetic conductive materials, and alloys thereof. In certain embodiments, the capping layer 460 protects the STO device 230 during formation of the STO device and formation of the magnetic write head 210, such as during deposition, patterning, cleaning, etc.

In certain embodiments, the NMG layer 410 comprises a low-heat-conductance layer. Examples of low-heat-conductance materials of the non-magnetic-conductive (NMG) layer 410 include ruthenium, tantalum, non-magnetic nickel alloys, non-magnetic iron alloys, alloys thereof, and multiple layers thereof.

In certain embodiments, the SPL 420 comprises a low-heat-conductance material. Examples of low-heat-conductance materials of the SPL 420 include magnetic nickel alloys, magnetic iron alloys, alloys thereof, and multiple layers thereof.

In certain embodiments, both the NMG layer 410 and the SPL 420 comprise a low-heat-conductance layer. The low-heat-conductance layer (NMG layer 410 and/or SPL 420) and the heat sink 280 form the temperature gradient 295. The temperature gradient 295 is formed across the SPL 420 and FGL 440 in which the temperature of the NMG layer 410 is relatively hotter than the temperature of the spacer layer 430 and in which the spacer layer 430 is relatively hotter than the capping layer 460. Due to the giant spin-Seebeck effect, the temperature gradient 295 causes a thermal spin current or magnon spin current through the FGL 440. The magnitude of the magnon spin current is proportional to the magnitude of the temperature gradient 295. The direction of the magnon spin current is in the direction of the temperature gradient 295 from hot to cold in a direction from the main pole 220 to the trailing shield 240.

In certain embodiments, the heat sink 280 comprising a high-heat-conductance electrically-conductive material is formed to a thickness 280T that is equal to or less than the thickness 269T of the notch 269. In certain embodiments, the heat sink 280 is formed to a thickness 280T less than the thickness 460T of the capping layer 460 to help ensure that electron current flow is from the main pole 220 through the NMG layer 410, through the SPL 420, through the first spacer layer 430, through the FGL 440, through the second spacer layer 450, and to the notch 269. If the heat sink 280 comprising a high-heat-conductance electrically-conductive material is formed to a thickness 280T that is greater than the thickness 460T of the capping layer 460, then some electron current may undesirably bypass the capping layer 460 and flow through the heat sink 280. Electron current by-passing the capping layer 460 would undesirably reduce the transmittal of spin current to the FGL 440 and would undesirably reduce the generated high-frequency assisting magnetic field, such as a microwave field.

In certain embodiments, the heat sink 280 comprising a high-heat-conductance electrically-insulating material is formed to any suitable thickness 280T is comparison to the thickness 460T of the capping layer 460, such as less than, equal to, or greater than the thickness 460T of the capping layer 460. For example, the heat sink 280 may be formed to a thickness 280T greater than the thickness 460T of the capping layer 460 for increased dissipation of the heat of the capping layer 460. For embodiments in which the heat sink 280 comprises a high-heat-conductance electrically-insulating material, electron current flow is from the main pole 220 through the NMG layer 410, through the SPL 420, through the first spacer layer 430, through the FGL 440, through the capping layer 460, and to the trailing shield 240 without bypassing the capping layer 460 since the heat sink 280 is electrically insulative. In certain embodiments, the thickness 280T of the heat sink 280 comprising a high-heat-conductance electrically-insulating material is larger than the thickness 460T of the capping layer 460 but less than the thickness 440T of the FGL 440 plus the thickness 460T of the capping layer 460.

In FIGS. 4-6, the temperature gradient 295 is produced so that the STO device 330 is relatively hot to relatively cold across the FGL 440 in a direction from the main pole 220 to the trailing shield 240. In FIGS. 5-6, the temperature gradient 295 is also produced so that the STO device 330 is relatively hot to relatively cold across the SPL 420 in a direction from the main pole 220 to the trailing shield 240. The layers of the STO device 230 undergoes joule heating when a bias current is applied to the STO device 230 to produce the microwave assist field to assist the recording field. The low-heat-conductance layer of the STO device 230, such as the NMG layer and/or SPL 420, causes the STO device 230 proximate the main pole 220 to relatively retain heat and to become relatively hot in temperature. The heat sink 280 comprising a high-heat-conductance material (electrically conductive or electrically insulative) causes the STO device 230 proximate the trailing shield 240 to dissipate heat and to become relatively cold in temperature. In certain embodiments, a temperature gradient 295 of 1.0 Kelvin/nm or more is produced across the STO device 230 from the NMG layer 410 to the spacer layer 450 in regards to FIGS. 4 and 5 and across the STO device 230 from the NMG layer 410 to the capping layer 460 in regards to FIG. 6. In certain embodiments, a temperature gradient 295 of 1.5 Kelvin/nm or more is across the STO device 230 from the NMG layer 410 to the spacer layer 450 in regards to FIGS. 4 and 5 and across the STO device 230 from the NMG layer 410 to the capping layer 460 in regards to FIG. 6. A temperature gradient of 1.0 Kelvin/nm produces a magnon spin current in a range from about $1\times10^{10}$ A/m$^2$ to about $1\times10^{11}$ A/m$^2$, which is a comparable magnitude of the critical current density $J_c$ of about $5\times10$ A/m$^2$ for magnetization reversal or switching of the FGL 440 of FIGS. 4-6 and the SPL 420 of FIGS. 5-6. Magnon spin current is generated by the temperature gradient 295 and not by temperature itself. In other words, the STO device 230 as a whole may be cold, but a temperature gradient 295 relatively hot to relatively cold across the FGL 440 and/or across the SPL 420 in a direction from the main pole 220 to the trailing shield 240 will produce a magnon spin current.

In certain embodiments, the electric-current-driven spin current and the magnon spin current produce a greater microwave-assist field to reduce the coercivity of the recording medium. In certain embodiments, the magnon spin current lowers the critical current for reversal of the FGL 440 and/or SPL 420 in accordance with the direction of the recording field from the main pole 220.

In regards to FIGS. 4-6, the magnetization direction of the FGL 440 is reversed to switch the direction of the oscillating field produced by the FGL 440. Switching the direction of the oscillating field of the FGL 440 provides a more consistent microwave assisting field when the recording field is changed from the switch in polarization of the write pole 220 for low write errors. A delay in reversal of the FGL 440 may undesirably cause longer write times and/or may increase write errors.

In regards to FIGS. 5-6, the magnetization direction of the SPL 420 is reversed to switch the magnetization direction of the injected electrons into the FGL 440. Switching of the magnetization direction of the injected electrons from the SPL 420 and the magnetization direction of the oscillating field produced by the FGL 440 produces a more consistent microwave assisting field for low write errors.

Figure 7:
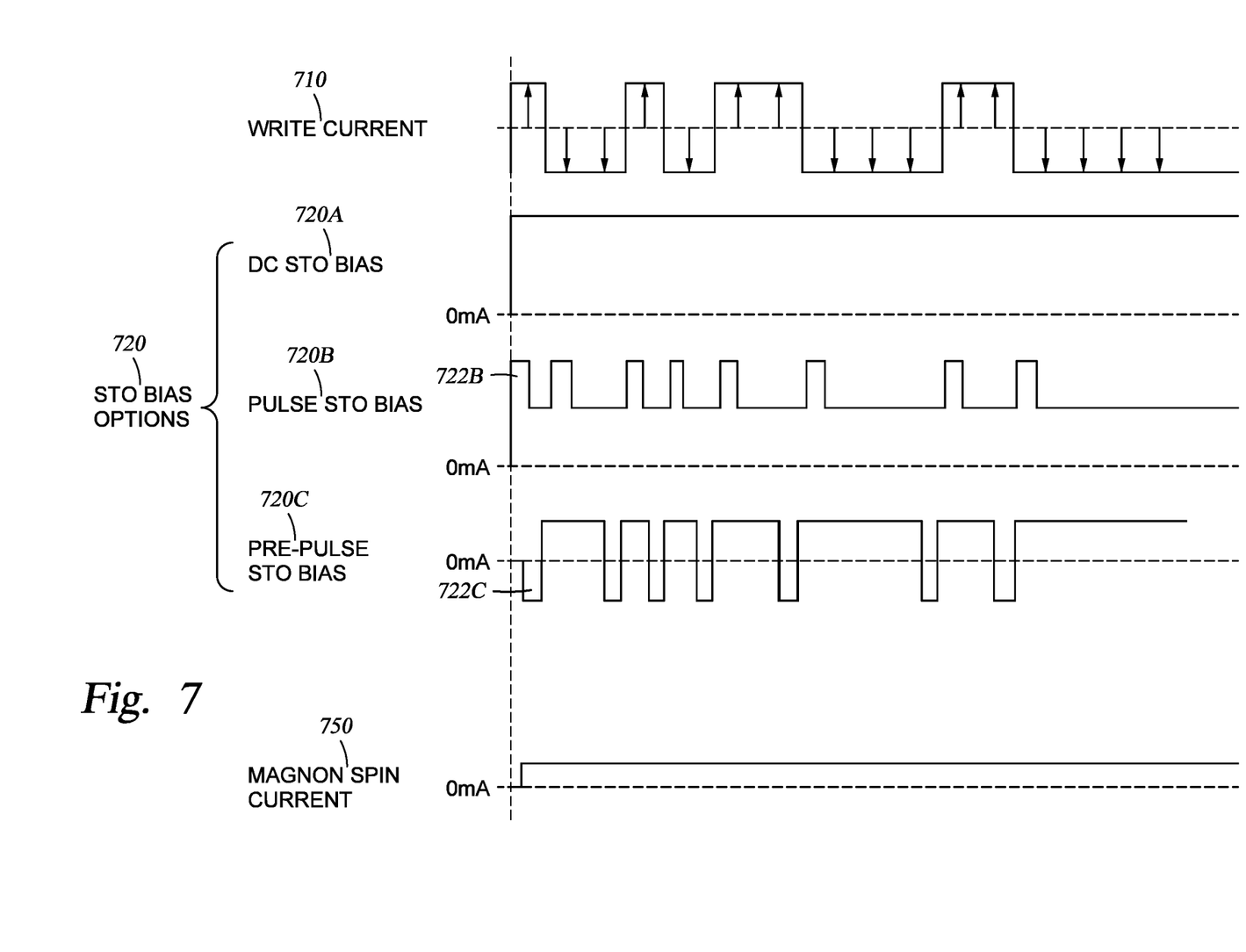
FIG. 7 is a schematic illustration of certain embodiments of waveforms of write electric currents supplied to q write coil of a main pole and of waveforms of bias currents applied to a STO device.

FIG. 7 is a schematic illustration of certain embodiments of waveforms of write electric currents supplied to the write coil 218 of the main pole 220 and of waveforms of bias currents applied to the STO device 230 of FIGS. 4-6.

The waveform 710 provided to the write coil 218 energizes the main pole 220 to produce a recording magnetic field to align or switch a media bit, such as a perpendicular recorded bit or a longitudinal recorded bit, of the magnetic recording medium in alignment with the recording magnetic field.

In certain embodiments, a waveform 720 is provided to the STO device 230 to provide an assisting microwave magnetic field. The waveform 720 may be a constant DC bias waveform 720A which remain on regardless of the change in polarity of the write current waveform 710. The waveform 720 may be a pulse assist waveform 720B. The pulse assist waveform 720B includes pulses 722B to roughly correspond whenever the write current waveform 710 changes polarity. The waveform 720 may be a pre-pulse assist waveform 720C with pulses 722C in the opposite polarity to rough precede the change in polarity of the write current waveform 710.

In certain embodiments, a magnon spin current 750 is produced by the temperature gradient 295 and is provided through the FGL 440 and/or SPL 420. Due to joule heating of the STO device 230, the magnon spin current 750 will be produced at various levels regardless of the shape of the waveform 720 of the bias current applied to the STO device 230. As long as there is a temperature gradient 295 from relatively hot to relatively cold in a direction from the main pole 220 to the trailing shield 240, a magnon spin current 750 will be produced. The magnon spin current 750 assists in the reversal of the magnetization direction of the FGL 440 and/or the SPL 420 reducing the lag time to establish a stable oscillation of the FGL 440 to produce an assisting microwave field after the switching of the recording field by the waveform 710 of the write current. Although the magnon spin current 750 is shown schematically at a constant level in FIG. 7, it is understood that the magnon spin current 750 may be at any level (such as increased, decreasing, undulating) during operation of the MAMR recording device.

EXAMPLES

TABLE 1 lists the thermal conductivities of various materials. These thermal conductivities are not to be used to limit the scope of the claims unless specifically set forth in the claims. Thermal conductivities may vary due to bulk measurements versus think film measurements, due to differences in preparing/depositing the materials, due to differences in the composition of the materials, due to differences in post-treatment of the materials (i.e., such as an anneal treatment), and/or due to other factors.

TABLE 1

| Material | Thermal Conductivity (at 25° C. at atmospheric pressure [W/m · K]) |
|---|---|
| Aluminum | 237 |
| Aluminum Nitride | 170-285 |
| Aluminum Oxide | 30 |
| Cobalt | 69 |
| Copper | 401 |
| Chromium | 91 |
| Diamond-like Carbon | 550 or greater |
| Graphite/Carbon Nanotubes | 379 or greater |
| Gold | 317 |
| Iron | 80 |
| Magnesium | 159 |
| Manganese | 8 |
| Nickel | 90 |
| Nickel Alloys | 12-60 |
| Platinum | 73 |
| Silver | 427 |
| Silicon Carbide | 120 |
| Silicon Nitride | 30 |
| Rhodium | 150 |
| Ruthenium | 58 |
| Tantalum | 57.5 |
| Titanium | 20 |
| Titanium Nitride | 19 |
| Tungsten | 178 |
| Zinc | 115 |

In other MAMR heads, heat sinks were used to lower the temperature of the main pole to increase the magnetization of a generated recording field. In some other MAMR heads, heat sinks were used to lower the temperature of the STO device to reduce joule heating of the STO device increasing the lifetime and reliability of the STO device. In still other MAMR heads, a temperature gradient was formed in which the notch was relatively hotter than the SPL.

In certain embodiments, the present MAMR head includes a spin torque oscillation (STO) device between a main pole and a trailing shield. The STO device includes one or more first layers proximate the main pole. The one or more first layers have a first heat conductance or include a low-heat-conductance material. The one or more first layers may be a low-heat-conductance non-magnetic conductive layer and/or a low-heat-conductance spin polarization layer. A heat sink is wrapped around a notch of the trailing shield or around a capping layer of the trailing shield without a notch. The heat sink has a second heat conductance or includes a high-heat-conductance material. The second heat conductance of the heat sink is higher than the first heat conductance of the one or more first layers. The high-heat-conductance of the heat sink and the low-heat-conductance of the first layer(s) produce a temperature gradient across the STO device from relatively hot to relatively cold in a direction from the main pole to the trailing shield. A magnon spin current is produced from the temperature gradient. The magnon spin current assists in the reversal of a magnetization direction of a field generation layer and/or spin polarization layer of the STO device.

In one embodiment, a magnetic recording device includes a main pole, a coil around the main pole, a trailing shield having a notch, and a spin torque oscillation device between the main pole and the notch of the trailing shield. The spin torque oscillation device includes a non-magnetic conductive layer and a field generation layer. The non-magnetic conductive layer is over the main pole. The non-magnetic conductive layer has a first heat conductance or includes a low-heat-conductance material. The field generation layer is between the non-magnetic conductive layer and the notch of the trailing shield. A heat sink is wrapped around the notch of the trailing shield. The heat sink has a second heat conductance or includes a high-heat-conductance material. The second heat conductance of the heat sink is higher than the first heat conductance of the non-magnetic conductive layer.

In another embodiment, a magnetic recording device includes a main pole, a coil around the main pole, a trailing shield, and a spin torque oscillation device between the main pole and the trailing shield. The spin torque oscillation device includes one or more first layers, a spacer layer, and a field generation layer. The one or more first layers are over the main pole. The one or more first layers have a first heat conductance or include a low-heat-conductance material. The one or more first layers may be a non-magnetic conductive layer and/or a spin polarization layer. The spacer layer is over the one or more first layers. The field generation layer is over the spacer layer. A heat sink is in contact with the trailing shield. The heat sink has a second heat conductance or includes a high-heat-conductance material. The second heat conductance of the heat sink is higher than the first heat conductance of the one or more first layers.

In one embodiment, a method of writing data to a magnetic medium includes providing a write current to a coil around a main pole to produce a recording field. An electron current is provided from the main pole through a field generation layer of a spin torque oscillation device to a trailing shield to produce a microwave assisting field. A temperature gradient from hot to cold is produced across the field generation layer in a direction from the main pole to the trailing shield. A magnon spin current is produced from the temperature gradient. The magnon spin current assists in reversal a magnetization direction of the field generation layer.

In still another embodiment, a magnetic recording device includes a writing means for providing a writing magnetic field. A spin torque oscillation means generates a microwave assisting field. A temperature gradient means produces a magnon spin current to assist in reversal of a magnetization direction of the spin torque oscillation means.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
    a main pole;
    a coil around the main pole;
    a trailing shield having a notch;
    a spin torque oscillation device between the main pole and the notch of the trailing shield, the spin torque oscillation device comprising:
        a non-magnetic conductive layer over the main pole, the non-magnetic conductive layer having a first heat conductance; and
        a field generation layer between the non-magnetic conductive layer and the notch of the trailing shield; and
    a heat sink wrapped around the notch of the trailing shield, the heat sink comprising having a second heat conductance, the second heat conductance of the heat sink higher than the first heat conductance of the non-magnetic conductive layer.

2. The magnetic recording device of claim 1, wherein the second heat conductance of the heat sink is a thermal conductivity of about 130 W/m·K or higher.

3. The magnetic recording device of claim 1, wherein the first heat conductance of the non-magnetic conductive layer is a thermal conductivity of about 90 W/m·K or lower.

4. The magnetic recording device of claim 1, wherein the heat sink comprises a material selected from a group consisting of as silver, copper, gold, aluminum, tungsten, alloys thereof, graphite, carbon nanotubes, and multiple layers thereof.

5. The magnetic recording device of claim 1, wherein the non-magnetic conductive layer comprises a material selected from a group consisting of ruthenium, tantalum, non-magnetic nickel alloys, non-magnetic iron alloys, alloys thereof, and multiple layers thereof.

6. The magnetic recording device of claim 1, wherein the heat sink and the non-magnetic conductive layer form a temperature gradient within the spin torque oscillation device from hot to cold in a direction from the main pole to the trailing shield.

7. The magnetic recording device of claim 1, wherein the notch is selected from a group consisting of an attached notch or a detached notch.

8. A magnetic media drive comprising the magnetic recording device of claim 1.

9. A magnetic recording device, comprising:
    a main pole;
    a coil around the main pole;
    a trailing shield;
    a spin torque oscillation device between the main pole and the trailing shield, the spin torque oscillation device comprising:
        one or more first layers having a first heat conductance over the main pole;
        a spacer layer over the one or more first layers; and
        a field generation layer over the spacer layer; and
    a heat sink in contact with the trailing shield, the heat sink having a second heat conductance, the second heat conductance of the heat sink higher than the first heat conductance of the one or more first layers.

10. The magnetic recording device of claim 9, wherein the one or more first layers comprises a non-magnetic conductive layer, the non-magnetic conductive layer formed over the main pole.

11. The magnetic recording device of claim 10, wherein the non-magnetic conductive layer comprises a material selected from a group consisting of ruthenium, tantalum, non-magnetic nickel alloys, non-magnetic iron alloys, alloys thereof, and multiple layers thereof.

12. The magnetic recording device of claim 9, wherein the one or more first layers comprises a spin polarization layer, the spin polarization layer formed over a non-magnetic conductive layer formed between the main pole and the spin polarization layer.

13. The magnetic recording device of claim 9, wherein the one or more first layers comprise a non-magnetic conductive layer and a spin polarization layer, the non-magnetic conductive layer formed over the main pole and the spin polarization layer formed over the non-magnetic conductive layer.

14. The magnetic recording device of claim 9, wherein the heat sink is wrapped around a notch of the trailing shield.

15. The magnetic recording device of claim 9, wherein the heat sink is wrapped around a capping layer formed between the field generation layer and the trailing shield.

16. The magnetic recording device of claim 9, wherein the heat sink comprises a material selected from a group consisting of as silver, copper, gold, aluminum, tungsten, alloys thereof, graphite, carbon nanotubes, and multiple layers thereof.

17. A magnetic media drive comprising the magnetic recording device of claim 9.

* * * * *